UNITED STATES PATENT OFFICE.

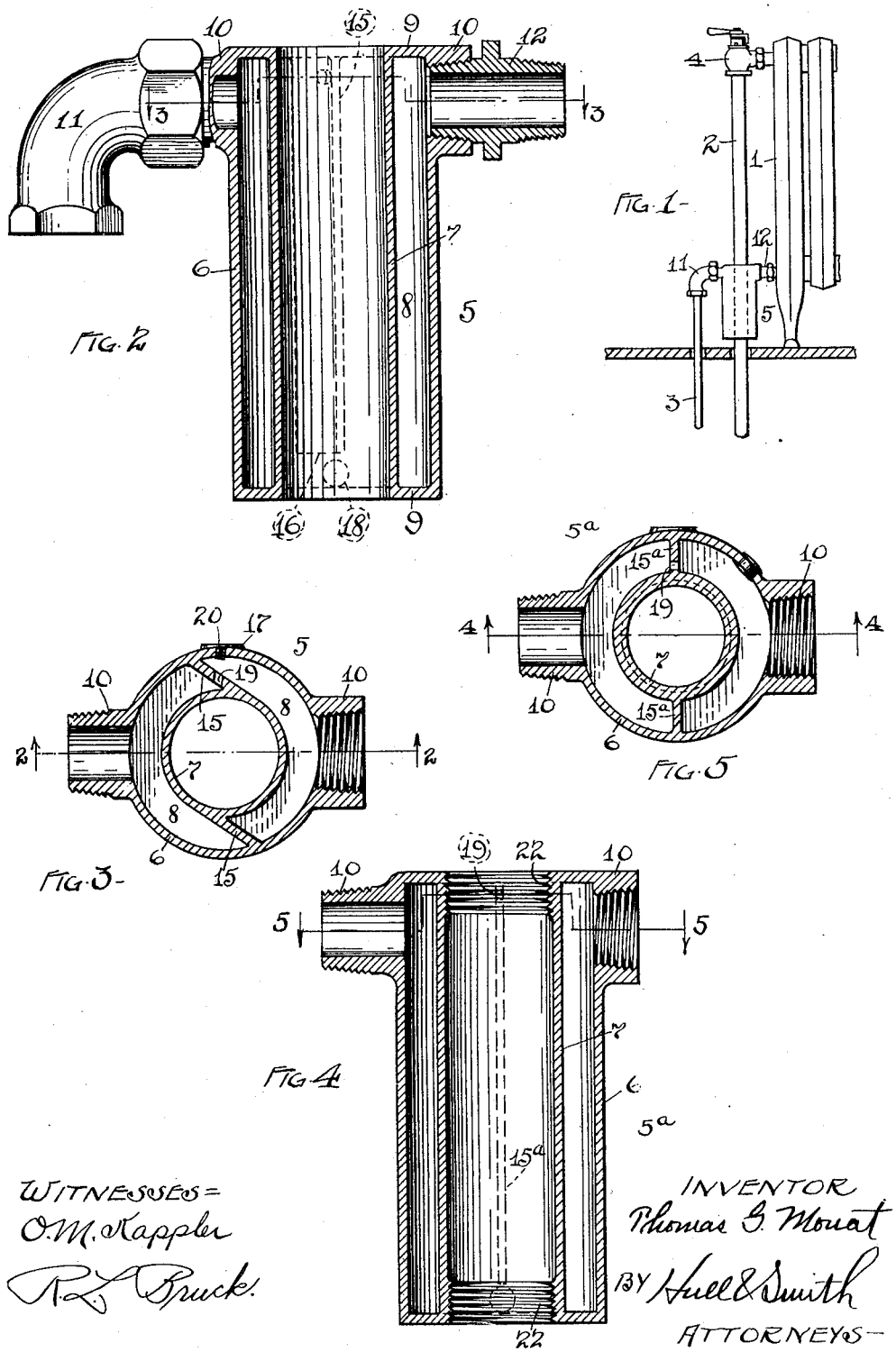

THOMAS G. MOUAT, OF CLEVELAND, OHIO.

RETURN-FITTING FOR VAPOR-HEATING SYSTEMS.

1,112,154.  Specification of Letters Patent.  Patented Sept. 29, 1914.

Application filed June 15, 1914. Serial No. 845,057.

*To all whom it may concern:*

Be it known that I, THOMAS G. MOUAT, a citizen of the United States, residing at Cleveland, in the county of Cuyahoga and State of Ohio, have invented a certain new and useful Improvement in Return-Fittings for Vapor-Heating Systems, of which the following is a full, clear, and exact description, reference being had to the accompanying drawings.

This invention relates to heating systems and particularly to that type of heating systems in which steam at extremely low pressures, usually called "vapor", is conducted to radiators and there condensed and returned to the boiler or vaporizer in the form of water. The steam is supplied to each radiator and the water of condensation is removed therefrom in separate pipes, and in order to reserve each pipe for the kind of fluid for which it is intended, a trap is employed. This invention particularly concerns the construction and arrangement of that trap and has for its objects an improvement in the design and arrangement of the same which shall facilitate the installation of the radiators, and which shall inhibit the freezing of the trap in cold weather; or in case of the freezing of the liquid in said trap shall cause the same to be thawed out very promptly upon the next use of the radiator to the end that the smallest possible derangement of the system may be produced.

Other objects and advantages of this invention will appear as the description proceeds.

Generally speaking my invention may be defined as consisting of the combinations and constructions recited in the claims hereto annexed and illustrated in the drawings accompanying and forming a part of this application, wherein;

Figure 1 is a view in side elevation of a portion of a radiator provided with my improved trap; Fig. 2 is a vertical, sectional view taken through the center of the preferred form of one of my traps and corresponding to the line of section indicated at 2—2 in Fig. 3; Fig. 3 is a transverse, cross-sectional view taken upon the broken line 3—3 in Fig. 2 and looking downwardly; Fig. 4 is a vertical, sectional view through a modified form of trap, the place of section being indicated at 4—4 in Fig. 5; and Fig. 5 is a horizontal, transverse view taken upon the line 5—5 in Fig. 4 and looking downwardly.

Describing the parts by reference characters, 1 represents a radiator which may be of any suitable or desirable type; 2 the steam supply pipe, and 3 the water return conduit. The steam supply pipe is connected to the radiator by means of a valve 4 which may be of any suitable or desirable type. The lower part of the radiator communicates with the return conduit 3 through the trap indicated generally at 5, which will now be described. This trap is preferably made in cylindrical form and consists of an outer casing 6 and an inner tube 7 coaxial therewith and spaced therefrom so as to define an annular chamber 8 whose upper and lower ends are closed by means of the webs 9—9, the ends of the tube 7 being left open as illustrated in Fig. 2. Adjacent to its upper end the shell 6 is provided with suitable pipe connections, here shown as threaded nipples 10—10 projecting horizontally in opposite directions and adapted for attachment to the radiator and return conduit respectively, suitable nipples 11, 12 being employed as in the usual manner.

Formed in each side of the chamber 8 and connecting the inner wall of the shell 6 with the outer wall of the tube 7 is a vertical septum 15 which extends from the upper end of the chamber to a point adjacent its lower end as shown at 16 so as to define therebeneath a passageway for fluid from one side of the chamber to the other.

The whole device is preferably made of cast metal, the rearward side of the shell being formed adjacent the bottom with a boss 17 in which is threaded a cleanout plug as shown at 18.

In the preferred construction the septa 15—15 are preferably arranged at an angle to the radius, as illustrated in Fig. 3 so as to permit a vent hole 19 to be drilled therethrough by passing a drill radially of the shell 6, the drill hole in the shell being thereafter closed by a plug 20 as shown in Fig. 3. With this construction the steam pipe 2 is passed through the tube 7 when the device is installed, thus facilitating the piping by permitting the pipes to be run in straight lines and with a minimum number of elbows and joints, and also maintaining the liquid in the trap at a proper temperature under all conditions.

In Figs. 4 and 5 I have illustrated a modified form of my device in which the septa 15ª—15ª are formed radially of the trap, the vent 19 being cored or drilled out as found desirable. Also in this embodiment the upper and lower ends of the tube 7 are interiorly threaded as illustrated at 22 so as to permit the upper and lower sections of the steam pipe to be connected directly therewith. It will be understood that in the system under consideration the steam pressure is so low as not to cause any perceptible steam flow through the vent aperture under any condition.

Even should the valve 4 be turned off for a long period of time, the steam pipe 2 will ordinarily remain sufficiently warm to prevent freezing of the water in the trap, even under the most severe weather and even though the radiator be set in an unused portion of the building. Furthermore, in case the water in this trap should freeze, it will immediately be thawed out upon the opening of this valve and will permit the proper operation of the radiator without necessitating the employment of additional expedients for thawing this trap.

Having thus described my invention what I claim is:—

1. A return fitting for vapor heating systems, comprising a cylindrical casting having spaced concentric walls defining an annular chamber, the ends of said chamber being closed and said inner wall defining the location for the steam supply, inlet and outlet connections carried by the outer wall and communicating with separated portions of said chamber, and an integral septum traversing said chamber at each side of said inner wall and extending from the closure at one end to a point adjacent to the closure at the other end, said septa being located between said inlet and outlet connections and one of the same having a vent aperture therethrough at a point adjacent the closure to which it is united.

2. In a vapor heating system, the combination, with a radiator having vertical coils and headers at the top and bottom of said coils, of a hollow upright cylindrical shell having an inlet and an outlet connection at its upper end, means connecting said inlet to said lower header, a return conduit connected to the said outlet, an upright cylindrical tube within said shell and spaced therefrom to form an annular chamber, integral webs connecting the upper and lower ends of said tube and shell and closing said chamber, an integral septum traversing said chamber at each side of said inner tube and extending from said upper web to a point adjacent to said lower web, said septa being located between said inlet and outlet and the lower end of the same being spaced from said lower web to form a passageway, the upper end of one of said septa being formed with a small aperture whereby substantial equality of pressure upon opposite sides thereof is secured, and a steam supply conduit connected to said upper header and passing through said inner tube.

3. In a vapor heating system, the combination, with a radiator having vertical coils and headers at the top and bottom of said coils, of a hollow upright cylindrical shell having an inlet and an outlet connection at its upper end, means connecting said inlet to said lower header, a return conduit connected to the said outlet, an upright cylindrical tube within said shell and spaced therefrom to form an annular chamber, integral webs connecting the upper and lower ends of said tube and shell and closing said chamber, an integral septum traversing said chamber at each side of said inner tube and extending from said upper web to a point adjacent to said lower web, said septa being located between said inlet and outlet and the lower end of the same being spaced from said lower web to form a passageway, the upper end of one of said septa being formed with a small aperture whereby substantial equality of pressure upon opposite sides thereof is secured, a steam conduit passing through said inner tube and connected to said upper header, and a shut off valve in said steam conduit between said tube and header.

4. A return fitting for vapor heating systems, comprising a cylindrical casting having spaced concentric walls defining an annular chamber, the ends of said chamber being closed and said inner wall defining the location for the steam supply, inlet and outlet connections carried by the outer wall and communicating with separated portions of said chamber, and an integral septum traversing said chamber at each side of said inner wall and extending from the closure at one end to a point adjacent to the closure at the other end, said septa being located at an angle to the radii which they intersect and being located between said inlet and outlet connections, one of said septa being formed with a radial vent aperture at a point adjacent its top and the outer wall being formed with a plugged aperture in alinement with said vent aperture.

5. A return fitting for vapor heating systems, comprising a cylindrical shell having an inlet and an outlet connection at its upper end, a cylindrical tube within said shell and spaced therefrom to form an annular chamber, integral webs connecting the upper and lower ends of said tube and shell and closing said chamber, a rigid septum traversing said chamber at each side of said inner tube and extending from the web nearest said inlet and outlet to a point adjacent the other web and spaced therefrom to form a passageway, there being a second smaller passageway connecting the inlet and outlet sides of said chamber adjacent to said first web.

In testimony whereof, I hereunto affix my signature in the presence of two witnesses.

THOMAS G. MOUAT.

Witnesses:
J. B. HULL,
BRENNAN B. WEST.